US011748461B1

(12) United States Patent
Richter

(10) Patent No.: US 11,748,461 B1
(45) Date of Patent: Sep. 5, 2023

(54) APPARATUS AND METHOD FOR VETTING A USER USING A COMPUTING DEVICE

(71) Applicant: Linda Lee Richter, Oakland, CA (US)

(72) Inventor: Linda Lee Richter, Oakland, CA (US)

(73) Assignee: Linda Lee Richter, Oakland, CA (US)

( * ) Notice: Subject to any disclaimer, the term of this patent is extended or adjusted under 35 U.S.C. 154(b) by 0 days.

(21) Appl. No.: 17/984,912

(22) Filed: Nov. 10, 2022

(51) Int. Cl.
 *G06F 21/31* (2013.01)
 *G06Q 20/40* (2012.01)

(52) U.S. Cl.
 CPC ........... *G06F 21/31* (2013.01); *G06Q 20/401* (2013.01)

(58) Field of Classification Search
 None
 See application file for complete search history.

(56) References Cited

U.S. PATENT DOCUMENTS

| | | | | |
|---|---|---|---|---|
| 9,485,237 | B1* | 11/2016 | Johansson | H04L 9/3271 |
| 9,514,407 | B1* | 12/2016 | Dotan | G06N 5/022 |
| 9,635,000 | B1* | 4/2017 | Muftic | H04L 9/3239 |
| 9,641,489 | B1* | 5/2017 | Kaufman | H04W 12/12 |
| 9,754,209 | B1* | 9/2017 | Kronrod | G06F 21/31 |
| 10,812,254 | B2* | 10/2020 | Chari | G06F 21/31 |
| 11,030,287 | B2* | 6/2021 | Obaidi | G06N 20/00 |
| 11,063,765 | B2* | 7/2021 | Schukai | H04L 9/3231 |
| 2014/0280087 | A1* | 9/2014 | Isensee | G06F 16/3329 |
| | | | | 707/723 |
| 2015/0373051 | A1* | 12/2015 | Dayan | H04L 63/0861 |
| | | | | 726/4 |
| 2018/0025140 | A1* | 1/2018 | Edelman | G06Q 20/4016 |
| | | | | 726/7 |
| 2018/0026968 | A1* | 1/2018 | Canavor | H04L 63/0823 |
| | | | | 726/6 |
| 2019/0095596 | A1* | 3/2019 | Manganelli | G06F 21/32 |
| 2019/0377853 | A1* | 12/2019 | Obaidi | G06F 21/32 |
| 2020/0036515 | A1* | 1/2020 | Chari | H04L 9/3239 |
| 2020/0042679 | A1* | 2/2020 | Fuentes | H04W 8/18 |
| 2020/0119922 | A1* | 4/2020 | Bingham | G06F 21/36 |
| 2020/0242489 | A1* | 7/2020 | Hama | G06F 3/14 |
| 2020/0285761 | A1* | 9/2020 | Buck | G06F 21/604 |
| 2021/0042755 | A1* | 2/2021 | Nolte | G06Q 20/3825 |

(Continued)

OTHER PUBLICATIONS

Jason Brownlee; 4 Types of Classification Tasks in Machine Learning; Apr. 8, 2020; https://machinelearningmastery.com/types-of-classification-in-machine-learning/ (Year: 2020).*

(Continued)

*Primary Examiner* — James R Turchen
(74) *Attorney, Agent, or Firm* — CALDWELL INTELLECTUAL PROPERTY LAW

(57) ABSTRACT

An apparatus and method for vetting a user using a computing device, wherein the apparatus includes at least a processor, a memory communicatively connected to the at least a processor, wherein the memory containing instructions configuring the at least a processor to receive a data collection from a user, wherein the data collection includes a plurality of data objects, construct a decision tree as a function of the data collection, wherein the decision tree includes a plurality of nodes, generate a trust datum as a function of the decision tree, and verify the user as a function of the trust datum, and a display communicatively connected to the at least a processor configured to present a visual interface.

18 Claims, 7 Drawing Sheets

(56) References Cited

U.S. PATENT DOCUMENTS

2021/0240853 A1* 8/2021 Carlson .................. G16H 10/20
2022/0350917 A1* 11/2022 Cuan ................... G06F 21/6227
2023/0035570 A1* 2/2023 Edwards ................ G06Q 20/40

OTHER PUBLICATIONS

Prashant Gupta; Decision Trees in Machine Learning; May 17, 2017; https://towardsdatascience.com/decision-trees-in-machine-learning-641b9c4e8052 (Year: 2017).*

* cited by examiner

US 11,748,461 B1

APPARATUS AND METHOD FOR VETTING A USER USING A COMPUTING DEVICE

FIELD OF THE INVENTION

The present invention generally relates to the field of data reception and verification on a decentralized platform. In particular, the present invention is directed to apparatus and method for vetting a user using a computing device.

BACKGROUND

Non-fungible token (NFT) may not necessary be used in cryptocurrency. It may be a unique representation of a user. Such unique representation may be needed on decentralized platforms and required rigorous validation and verification.

SUMMARY OF THE DISCLOSURE

In an aspect, an apparatus for vetting a user using a computing device, wherein the apparatus includes at least a processor, a memory communicatively connected to the at least a processor, wherein the memory containing instructions configuring the at least a processor to receive a data collection from a user, wherein the data collection includes a plurality of data objects, construct a decision tree as a function of the data collection, wherein the decision tree includes a plurality of nodes, generate a trust datum as a function of the decision tree, and verify the user as a function of the trust datum, and a display communicatively connected to the at least a processor configured to display a visual interface.

In another aspect, a method for vetting a user using a computing device, the method includes receiving, using at least a processor, a data collection containing a plurality of data objects, constructing, using the at least a processor, a decision tree as a function of the data collection, wherein the decision tree includes a plurality of nodes, generating, using the at least a processor, a trust datum as a function of the data collection, verifying, using the at least a processor, the user as a function of the trust datum, and displaying, using a display, a visual interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
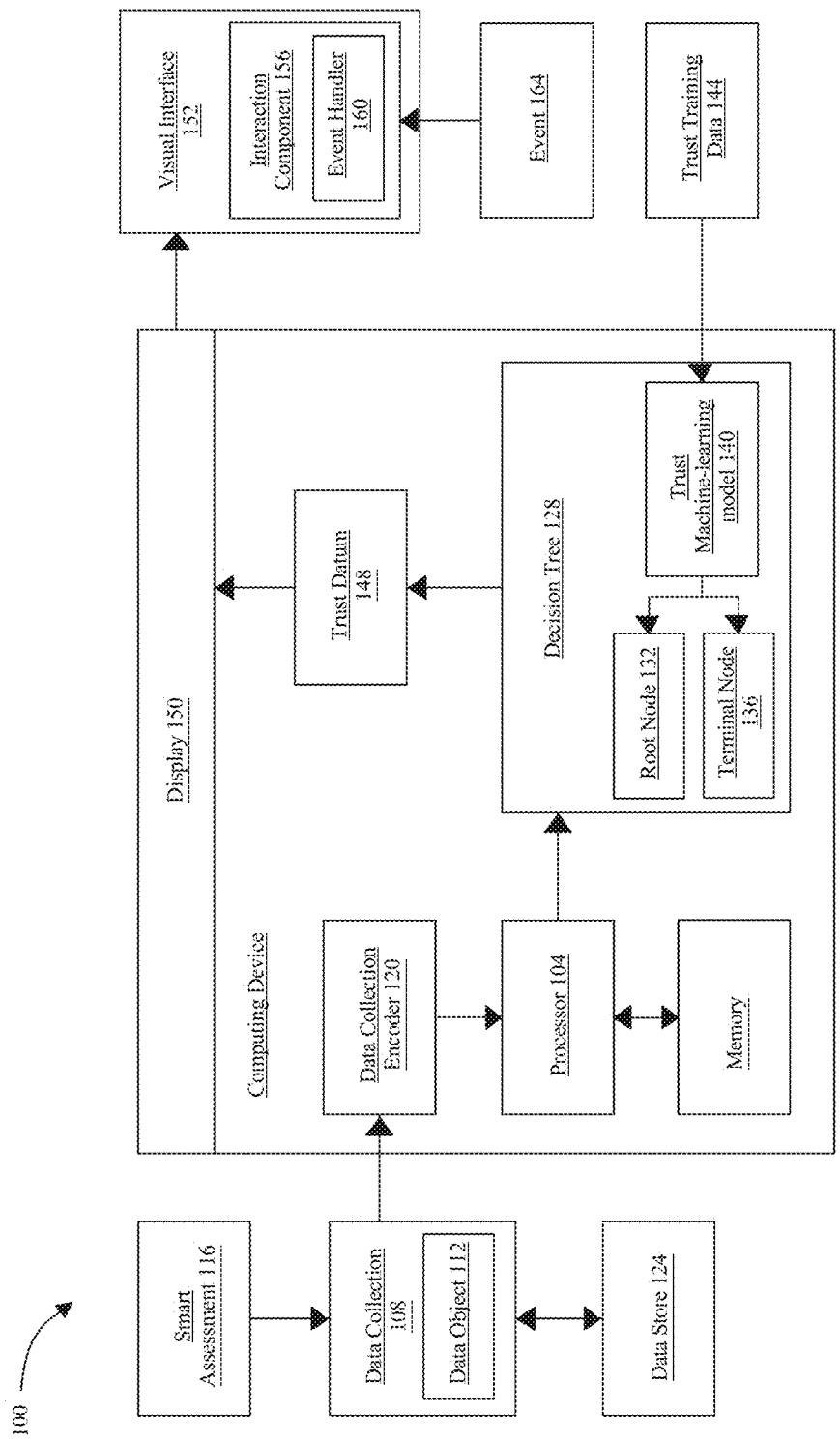
FIG. 1 is block diagram illustrating an exemplary apparatus for vetting user using a computing device.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for vetting a user using a computing device, wherein the apparatus includes at least a processor, a memory communicatively connected to the at least a processor, wherein the memory containing instructions configuring the at least a processor to receive a data collection from a user, wherein the data collection includes a plurality of data objects, construct a decision tree as a function of the data collection, wherein the decision tree includes a plurality of nodes, generate a trust datum as a function of the decision tree, and verify the user as a function of the trust datum, and an interface communicatively connected to the at least a processor configured to display a visual interface.

At a high level, aspects of the present disclosure are directed to a method for vetting a user using a computing device, the method includes receiving, using at least a processor, a data collection containing a plurality of data objects, constructing, using the at least a processor, a decision tree as a function of the data collection, wherein the decision tree includes a plurality of nodes, generating, using the at least a processor, a trust datum as a function of the data collection, verifying, using the at least a processor, the user as a function of the trust datum, and displaying, using an interface, a visual interface.

Exemplary embodiments illustrating aspects of the present disclosure are described below in the context of several specific examples.

In an embodiment, apparatus and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for vetting user is illustrated. Apparatus includes a processor 104 and a memory communicatively connected with the processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive a data collection 108 from a user. As used in this disclosure, "receive" means to accept, collect, or otherwise gather input from a user and/or a device. As used in this disclosure a "data collection" is an element containing a data object 112 related to the user. As used in this disclosure, a "data object" is a single piece of data. In some cases, data collection 108 may include a plurality of data objects. In a non-limiting example, a data collection may be a string containing a plurality of words, wherein each word may be a data object. In some cases, data collection 108 may be in various format such as, without limitation, txt file, JSON file, word document, pdf file, excel sheet, image, video, audio, and the like thereof. In other cases, data collection 108 may be present in any data structure described in this disclosure. In some embodiments, without limitation, data collection 108 may include any personal information related to the user. In some cases, personal information may include, without limitation, user's name, age, gender, identification, profession, experience, social media posts, geographical information, family information, employer, and the like thereof. In some embodiments, without limitation, data collection 108 may also include any finance information related to the user. In some cases, finance information may include, without limitation, assets, income, expense, debts, and the like thereof. In other embodiments, data collection 108 may further include any health information related to the user. In some cases, health information may include, without limitation, wellness, insurance, medical records, disease records, lifestyle, and the like thereof. In a non-limiting example, processor 104 may receive a data collection in a text file format, wherein the data collection may include user's personal information such as, without limitation, user's name, age, gender, home address, and the like thereof.

With continued reference to FIG. 1, in some embodiments, data collection 108 may be present as a vector. As used in this disclosure, a "vector" is a data structure that represents one or more quantitative values and/or measures of data collection 108. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n}a_i^2}$, where $a_i$ is attribute number i of the vector. Scaling and/or normalization may function to make vector comparison independent of absolute quantities of attributes, while preserving any dependency on similarity of attributes.

With continued reference to FIG. 1, in some embodiments, data collection 108 may be present as a dictionary. As used in this disclosure, a "dictionary" is a data structure containing an unordered set of key value pairs. In this disclosure, a "key value pair" is a data representation of a data element such as, without limitation, data object 112. In some cases, dictionary may be an associative memory, or associative arrays, or the like thereof. In a non-limiting example, dictionary may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key:first/second value." In a further non-limiting example, data collection 108 may be present as a dictionary: "{1: A, 2: B, 3: C}," wherein A may be a first user related data correspond to a first data object 1, B may be a second user related data correspond to a second data object 2, and C may be a third user related data correspond to a third data object 3. Data object 112 may include any kind of information related to the user such as, without limitation, user's personal information, financial information, health information, and the like thereof. Additionally, or alternatively, dictionary may include a term index, wherein the term index is a data structure to facilitate fast lookup of data object 112 in data collection 108 (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash algorithms. Hash algorithms may be any hash algorithm described above in this disclosure. In a non-limiting example, data collection may be present as a dictionary containing a plurality of hashes, wherein each hash of plurality of hashes represents a single data object. Hash may be any cryptographic hash as described above in this disclosure.

With continued reference to FIG. 1, in other embodiments, data collection 108 may be present as any other data structure such as, without limitation, tuple, single dimension array, multi-dimension array, list, linked list, queue, set, stack, dequeue, stream, map, graph, tree, and the like thereof. In some embodiments, data collection 108 may be present as a combination of more than one above data structures. In a non-limiting example, data collection 108 may be a dictionary of lists. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, data collection 108 may be an immutable data collection, wherein the immutable data collection is a data collection that cannot be changed, modified, and/or updated once the data collection is received. In other embodiments, without limitation, data collection 108 may be a mutable data collection, wherein the mutable data collection is a data collection that can be changed, modified, and/or updated once the data collection is received.

With continued reference to FIG. 1, in some cases, data objects related to the user within data collection 108 may be sorted in a certain order such as, without limitation, ascending order, descending order, and the like thereof. In some embodiments, without limitation, sorting data objects related to the user within data collection 108 may include using a sorting algorithm. In some cases, sorting algorithm may include, but is not limited to, selection sort, bubble sort, insertion sort, merge sort, quick sort, heap sort, radix sort, and the like thereof. As will be appreciated by persons having ordinary skill in the art, after having read the entirety of this disclosure, the foregoing list is provided by way of example and other sorting algorithm can be added as an extension or improvements of apparatus 100 disclosed herein.

With continued reference to FIG. 1, additionally, or alternatively, data collection 108 may include an implicit data collection. As used in this disclosure, an "implicit data collection" is a data collection that is received by processor 104 in an implicit or non-invasive manner, wherein the implicit or non-invasive manner is a way that is not directly expressed to the user. In a non-limiting example, processor 104 may receive an implicit data collection containing temporal information (i.e., time duration) of the user's completion of the smart assessment 116 described in further detail below. In some cases, implicit data collection may include, without limitation, information regarding to user's facial activity, posture activity, event activity, vocal expression, language and choice of words, electrodermal activity, any other information that implies user's reliability, and the like thereof. In a non-limiting example, implicit data collection may include a fingerprint received through a digital fingerprinting, wherein the fingerprint is a unique identifier of one or more data objects 112, and wherein the digital fingerprinting is a computational process used to identify and track user, apparatus 100, processor 104, and any other devices described in this disclosure online through a fingerprinting algorithm. In some cases, fingerprint may include, without limitation, acoustic fingerprint, digital video fingerprint, browser fingerprint, and any other digital fingerprint, and the like thereof. In some cases, fingerprinting algorithm may include, without limitation, Rabin's algorithm, hash algorithm described above, and the like thereof. In another non-limiting example, implicit data collection may include one or more data objects 112 received through a network latency analysis, wherein the network latency analysis may provide information regarding to user's current network such as, without limitation, internet protocol, internet protocol address, current domain name system, download speed, upload speed, round trip time (RTT), time to first byte (TTFB), and the like thereof.

With continued reference to FIG. 1, further, data collection 108 may include one or more data objects 112 that describes one or more signals. as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables.

With continued reference to FIG. 1, in some embodiments, receiving data collection 108 may include accepting a smart assessment 116 from the user. As used in this disclosure, a "smart assessment" is a set of questions that asks for a user's information, wherein each question contains answers that influences user authentication, verification, and/or any processing step described in this disclosure. In some cases, a question within smart assessment 116 may include selecting a selection from plurality of selections as answer. In other cases, question within smart assessment 116 may include a free user input as answer. In a non-limiting example, smart assessment 116 may include a question asking the user regarding to percentage of intellectual property (IP) ownership; for instance, the question may be "Does user/entity have all rights in their intellectual property?" In some cases, smart assessment 116 may be in a form such as, without limitation, survey, transactional tracking, interview, report, events monitoring, and the like thereof. In some embodiments, smart assessment 116 may include a data submission of one or more documentations from the user. As used in this disclosure, a "data submission" is an assemblage of data provided by the user as an input source. In a non-limiting example, data submission may include user uploading one or more data collections 108 to processor 104. As used in this disclosure, a "documentation" is a source of information. In some cases, documentation may include electronic document, such as, without limitation, txt file, JSON file, word document, pdf file, excel sheet, image, video, audio, and the like thereof. In a non-limiting example, documentation may include data collection 108, and may be input source of data submission for further processing. Further processing may include any processing step described below in this disclosure. Additionally, or alternatively, data collection 108 may include one or more answers of smart assessment 116. In a non-limiting example, each data object 112 may represent a single question within smart assessment 116 and corresponding answer to the single question.

With continued reference to FIG. 1, in some embodiments, questions within smart assessment 116 may be selected from a pre-defined set of questions, wherein the pre-defined set of questions are questions user specified prior to accepting smart assessment 116. In some cases, user may be a system administrator. In a non-limiting example, questions of smart assessment 116 may be selected from a question bank, wherein the question bank may include a plurality of example questions. Additionally, or alternatively, processor 104 may be configured to generate smart assessment 116 and/or questions within smart assessment 116. In some embodiments, smart assessment 116 may include a base question. Base question may be a question from pre-defined set of questions described above. Processor 104 may be configured to generate questions within smart assessment 116 based on the answer to base question. In a non-limiting example, questions after base question of smart assessment 116 may be generated using decision tree 128 described in further detail below.

With continued reference to FIG. 1, in some embodiments, receiving data collection 108 may further include encoding data collection 108 using a data collection encoder 120. As used in this disclosure, a "data collection encoder" is a component that converts an input source into a coded output. In some cases, data collection encoder 120 may include implementation of cryptographic system as described above in this disclosure. In some embodiments, without limitation, encoding data collection 108 may include converting an analogue signal to a digital signal. As used in this disclosure, a "digital signal" is a discrete time, quantized amplitude signal. In some cases, digital signal may include one or more samples that take on values from a discrete set, wherein the discrete set is a countable set that can be mapped one-to-one to a subset of integers. In a non-limiting example, digital signal may represent a 16-bit (65,536 levels) signal. As used in this disclosure, an "analog signal" is a continuous signal represent some other quantity. In a non-limiting example, analog signal may be an instantaneous single voltage. In some embodiments, without limitation, encoding data collection 108 may include converting data collection 108 into a coded message format, wherein the coded message format may occupy fewer storage than data collection 108. In a non-limiting example, encoding data collection 108 may include compressing data collection 108 using data collection encoder 120. As used in this disclosure, "compressing" means reducing, shrinking, or otherwise minimizing the size (i.e., number of bits and/or bytes) of a data collection encoder input such as, without limitation, data object 112, data collection 108, and the like thereof. In some cases, compressing data collection 108 may include compressing all kinds of information within data collection 108 such as, without limitation, text, images, video, audio, any type of electronic files, and the like thereof. In some embodiments, without limitation, compressing data collection 108 may include removing redundant data object 112 through a lossless compression, wherein the lossless compression is a type of compression which includes breaking data collection 108 into a plurality of smaller data form on one end for transmission or storage and then combining the plurality of smaller data form back on another end. In a non-limiting example, data collection encoder 120 may create a data structure such as a dictionary for storing redundant data object 112 within data collection 108. Data collection encoder 120 may then replace redundant data object 112 within data collection 108 with a placeholder, wherein the placeholder may be any kind of data structure or data type with a size that is smaller than redundant data object 112 being replaced. Further processing step may use dictionary to restore data object 112 back into data collection 108 by matching data object 112 within dictionary to placeholder within data collection 108. In other embodiments, without limitation, compressing data collection 108 may include removing data objects 112 through a lossy compression, wherein the lossy compression is a type of compression which includes eliminating unnecessary data objects and tailoring data collection 108. In a non-limiting example, received data collection 108 may be an image upload by the user. Data collection encoder 120 may prominently remove one or more pixels within image to reduce the size of data collection 108 before proceeding to any further processing steps described in this disclosure. Further, data collection encoder 120 may include a data collection decoder configured to perform any function of data collection encoder 120 described above in reverse.

With continued reference to FIG. 1, in some embodiments, data collection 108 may be received and/or stored in a data store 124 such as, without a limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, data store 124 may include a blockchain storage. In some embodiments, blockchain storage may be a decentralized data store. In a non-limiting example, blockchain storage may be configured to save data such as, without limitation, data collection 108 in a decentralized network, wherein the decentralized network may distribute data collection 108 and/or data collection processing across multiple devices. Data collection processing may include any processing step described in this disclosure. In some embodiments, blockchain storage may be configured to process data collection 108 through a sharding process, wherein the sharding process is a data store partitioning that separates into a plurality of smaller data stores known as data store shards. As used in this disclosure, a "data store shard" is a horizontal/vertical partition of data such as, without limitation, data collection 108 in a data store that hold on a separate instance of the data store. Each shard may be copied to prevent data loss. Additionally, or alternatively, data collection 108 may be encrypted with private key. Private key may be any encryption key described above in this disclosure. Encryption of data collection 108 may include any processing steps described anywhere in this disclosure. Additionally, or alternatively, any processing step regarding to data collection 108 may be performed within a decentralized platform. In a non-limiting example, decentralized platform may be consistent with any decentralized platform disclosed in U.S. patent application Ser. No. 17/984,678, filed on Nov. 10, 2022, entitled "APPARATUS AND METHOD FOR GENERATING USER-SPECIFIC SELF-EXECUTING DATA STRUCTURES". Certain blockchain embodiments in accordance with the present disclosure are further discussed below with reference to FIG. 5.

With continued reference to FIG. 1, in some embodiments, data store 124 may include a web storage, wherein the web storage is a data store for storing client-side (i.e., user side) data such as, without limitation, data collection 108. In a non-limiting example, web storage may be configured to store user's identification number (ID) and username within data collection 108. In some embodiments, without limitation, web storage may include a local storage, wherein the local storage is a web storage that store data collection 108 with no expiration date. In other embodiments, without limitation, web storage may include a session storage, wherein the session storage is a web storage that stores data collection 108 for a session, wherein the session is a time-delimited two-way link between two or more devices or ends. In a non-limiting example, user may start a session by open visual interface 152. Data collection 108 may be stored in a session storage during any processing step described in this disclosure. Data collection 108 may be deleted and unavailable to both user and apparatus 100 when visual interface 152 is closed. Visual interface 152 may be described in further detail below.

With continued reference to FIG. 1, processor 104 is further configured to construct a decision tree 128 as a function of the data collection 108, wherein the decision tree 128 includes a plurality of nodes. In a non-limiting example, processor 104 may map one or more data objects 112 within data collection 108 to each node of plurality of nodes within decision tree 128. As used in this disclosure, a "decision tree" is a data structure that represents and combines one or more determinations or other computations based on and/or concerning data provided thereto, as well as earlier such determinations or calculations, as nodes of a tree data structure where inputs of some nodes are connected to outputs of others. As used in this disclosure, a "node" of a tree is an entity which contains a value or data and optionally contains one or more connection to other nodes. Plurality of nodes within decision tree 128 has at least a root node 132, or node that receives data input to the decision tree 128, corresponding to data collection 108. Plurality of nodes within decision tree 128 has at least a terminal node 136, which may alternatively or additionally be referred to herein as a "leaf node," corresponding to an execution result of decision tree 128. In other words, decisions and/or determinations produced by decision tree 128 may be output at the at least a terminal node 136. In a non-limiting example, terminal node 136 may include a trust datum as execution result of decision tree 128. Trust datum disclosed here will be described in further detail below. In some embodiments, plurality of nodes within decision tree 128 may include one or more internal nodes, defined as nodes connecting outputs of root nodes 132 to inputs of terminal nodes 136. In some cases, processor 104 may generate two or more decision trees 128, which may overlap. In a non-limiting example, a root node of one decision tree may connect to and/or receive output from one or more terminal nodes of another decision tree, intermediate nodes of one decision tree may be shared with another decision tree, or the like.

With continued reference to FIG. 1, in some embodiments, constructing decision tree 128 using processor 104 may include constructing decision tree 128 as a function of a decision metric. As used in this disclosure, a "decision metric" is a quantitative measurement for determining one or more branches within decision tree 128 from root node 132 to terminal node 136 of plurality of nodes. In a non-limiting example, plurality of nodes within decision tree 128 may be split according to decision metric, wherein resulting branches (i.e., sub-trees) between plurality of nodes may include a better decision metric than previous tree; for instance, a higher probability of one class. As used in this disclosure, a "branch" is a connection between two nodes of decision tree 128. Nodes may include any node described above such as, without limitation, root node, terminal node, internal node, and the like thereof. In some embodiments, branch may include a relation indicator, wherein the relation indicator is an element indicates a single relationship between connected nodes. In some cases, relation indicator may include any data type such as, without limitation, string, integer, Boolean, object, and the like thereof. In a non-limiting example, root node 132 may be connected to a first terminal node through a first branch and a second terminal node through a second branch, wherein the first branch may include a first relation indicator of string "yes" and the second branch may include a second relation indicator of string "no." In a non-limiting example, decision metric may include an entropy, wherein the entropy is a measurement of randomness in data collection 108 and measures an amount of uncertainty within data collection 108. Decision tree 128 with a high entropy as decision metric may include more nodes and branches. In a non-limiting example, decision metric may include a Gini index, wherein the Gini index is a measurement of probability (i.e., likelihood) of a given data object 112 misclassified by a particular node of decision tree 128. In a non-limiting example, decision metric may include an information grain (IG), wherein the information gain is a measurement of reduction in entropy or Gini index during the constructing process of decision tree 128. As will be appreciated by persons having ordinary skill in the art, after having read the entirety of this disclosure, the foregoing list is provided by way of example and other metrics for determining branches and/or feature split can be added as an extension or improvements of apparatus 100 disclosed herein.

With continued reference to FIG. 1, in a non-limiting example, processor 104 may be configured to specify a root node 132, wherein the root node 132 may be a base question of smart assessment 116. Processor 104 may be configured to accept an input such as, without limitation, data collection 108 from the user and recursively performing mapping of input element such as, without limitation, data object 112 to root node 132; for instance, processor may map an answer to base question of root node 132. Root node 132 may be split into a plurality of internal nodes based on a decision metric, wherein the decision metric may be a match of an answer; for instance, root node 132 may be connected with a first internal node through a first branch containing a first answer to base question and a second internal node through a second branch containing a second answer to base question. First internal node may include a different question than second internal node. Processor 104 may connect root node 132 and one or more matched internal nodes with matched decision metric and continue map the next data object 112 within data collection 108. Processor 104 may create a plurality of terminal nodes 136 at the end of recursive input mapping. Each terminal node 136 may be a final question of smart assessment 116. Processor 104 may construct decision tree 128 by enforcing connections/branches between root node 132 and plurality of internal nodes and connections/branches between plurality of internal nodes and plurality of terminal nodes through decision metric. Terminal node 136 may include a final decision; for instance, trust datum that correspond to final question of smart assessment 116. Trust datum disclosed here will be described in further detail below.

With continued reference to FIG. 1, in some embodiments, decision tree 128 may incorporate one or more manually entered or otherwise provided decision metrics. In a non-limiting example, user may provide a decision metric for constructing decision tree 128 that is independent to data collection 108. Additionally, or alternatively, decision tree 128 may perform one or more data store lookups. Data store may be any data store described in this disclosure. In a non-limiting example, data store 124 may include a previously existent calculation and/or decision tree configured to make a decision corresponding to a given node, for instance and without limitation using one or more data objects 112 within data collection 108, by receiving an input and producing an output representing a decision, a node may be configured to provide data to the input and receive the output representing the decision, based upon which the node may perform its decision.

Still referring to FIG. 1, in some embodiments, constructing decision tree 128 may include training a machine-learning process to generate decision tree 128 for given data collection from the user. A "machine-learning process," as used in this disclosure, is a process that automatedly uses training data to generate an algorithm and/or model, defined as a "machine-learning model" that will be performed by a processor 104/module to produce outputs given data provided as inputs, for instance and without limitation as described in further detail below; this is in contrast to a non-machine learning software program where the commands to be executed are determined in advance by a user and written in a programming language. Training data, which may include any training data as described in further detail below, is data including correlations and/or examples usable by a machine learning algorithm to generate machine-learning process and/or to be operated on by a lazy learning algorithm as described below. Training data may be obtained by processor 104 in any manner and/or form as described anywhere in this disclosure, including and without limitation retrieving from data store 124. In a non-limiting example, processor 104 may train machine-learning process using decision tree training data, wherein the decision tree training data includes a plurality of data collections as input correlated to a plurality of decision trees as output. Processor 104 may then generate decision tree 128 as a function of the trained machine-learning process.

Continuing to refer to FIG. 1, machine-learning process may include a classifier, which may classify inputs such as data collection 108 to decision metric, decision tree 128, and the like thereof. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees 128, boosted trees, random forest classifiers, learning vector quantization, and/or neural network-based classifiers. As a further non-limiting example, classification may be performed using a neural network classifier such as without limitation a convolutional neural network-based classifier. A convolutional neural network is a neural network in which at least one hidden layer is a convolutional layer that convolves inputs to that layer with a subset of inputs known as a "kernel," along with one or more additional layers such as pooling layers, fully connected layers, and the like.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, Processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, decision tree 128 may incorporate the use of one or more machine-learning processes to form a new data structure. Machine-learning process may include any machine-learning process described in this disclosure. In a non-limiting example, each node of plurality of nodes may include a utilization of a trust machine-leaning model 140 trained using a trust training data 144, wherein the trust training data 144 comprises a plurality of data objects as input correlated to a plurality of trust data 148 as output. Trust training data 144 may be obtained by processor 104 in any manner and/or form as described anywhere in this disclosure, including and without limitation retrieving from data store 124. Trust datum disclosed here will be described in further detail below. In another non-limiting example, trust machine-learning model 140 may include a language processing module configured to extract one or more data objects, any textual information, and/or the like from data collection 108. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naïve-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface such as visual interface 152, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, processor 104 is further configured to generate a trust datum 148 as a function of decision tree 128. As used in this disclosure, a "trust datum" is a data structure containing information regarding to a user's credibility, corresponding to data collection 108 received from the user. In some embodiments, trust datum may include a quantitative measurement that indicates an extent of amount of true information (i.e., data objects) within data collection 108. In a non-limiting example, trust datum 148 may include a trust score, wherein the trust score is a quantitative evaluation of data collection 108. Trust score may be on a scale of x to y, wherein x may represent a minimum trust score and y may represent a maximum trust score; for instance, trust score may be on a scale of 0 to 100, wherein a trust score close to 0 may be a low trust score, and a trust score close to 100 may be a high trust score. Low trust score may indicate data collection 108 corresponding to trust datum 148 is less reliable, while high trust score may indicate data collection 108 corresponding to trust datum 148 is more reliable. In some embodiments, trust datum 148 may include a plurality of trust scores, wherein each trust score of plurality of trust scores may associate with a single data object 112. An overall trust score may be calculated, generated, or determined as a function of plurality of trust scores. Further, trust datum may be used in any processing step described in this disclosure.

With continued reference to FIG. 1, in some embodiments, generating trust datum 148 may include traversing decision tree 128 as a function of data collection 108, identifying a node within decision tree 128, and generating trust datum 148 as a function of the identified node. In a non-limiting example, processor 104 may sequentially iterate over data collection 108 and map each data object 112 of plurality of data objects within data collection 108 to plurality of nodes within decision tree 128. Trust machine-learning model 140 may be configured to classify a trust datum 148 and map data object to at least a node such as, without limitation, at least a root node 132, internal node, at least a terminal node, and the like as a function of the trust datum. Trust machine-learning model 140 may be used to map output of one decision tree 128 to input of another, for instance, and without limitation, using classification as described above or the like. At least a terminal node 136 may be identified at the end of decision tree 128 after mapping data objects 112 within data collection 108. There may not be any subsequent node and/or branch after at least a terminal node 136 (i.e., identified node). In some cases, trust datum may be generated by trust machine-learning model 140 within identified node. In other cases, trust datum may be generated as a function of plurality of trust datum generated by all traveled node during decision tree traversal; for instance, a final trust datum may be generated by append a third trust datum generated by identified node to a second datum generated by internal node and append the second datum to a first trust datum generated by at least a root node 132. In some embodiments, identifying node within the decision tree may include identifying a plurality of proximal nodes; for instance, trust machine-learning model 140 may determine a plurality of trust datum, wherein each trust datum may share a similar likelihood and direct to different nodes within decision tree 128.

With continued reference to FIG. 1, in some embodiments, trust datum may include an element of smart assessment 116 such as, without limitation, a question within smart assessment 116, a correct answer for a question within smart assessment 116, and the like thereof. In some cases, generating trust datum 148 may include modifying smart assessment 116 as a function of trust datum. In an embodiment, without limitation, modifying smart assessment 116 may include change, replace, create, or otherwise remove one or more questions and/or any other interaction components within smart assessment 116. In a non-limiting example, smart assessment 116 may include a first question start from at least a root node 132. Trust machine-learning model 140 within at least a root node may classify data collection 108 containing one or more data objects 112 related to an answer for first question into a first trust datum, wherein the first trust datum may include a second question. In some cases, trust datum 148 may include a branch to next node such as, without limitation, internal node, at least a terminal node, and the like thereof. In other embodiments, without limitation, modifying smart assessment 116 may include modifying smart assessment 116 as a whole; for instance, starting a new smart assessment with a new set of questions for the user based on trust datum 148 of identified node at the end of decision tree 128 as described above.

With continued reference to FIG. 1, processor 104 is further configured to verify the user as a function of the trust datum 148. As used in this disclosure, "verification" is a process of ensuring that which is being "verified" complies with certain constraints, for example without limitation system requirements, regulations, and the like. In some cases, verification may include comparing a product, such as without limitation trust datum 148, trust score, any other information within trust datum 148, and/or the like against one or more acceptance criteria. For example, in some cases, trust score within trust datum 148 may be required to exceed a minimum trust score requirement. Ensuring that trust datum 148 is in compliance with acceptance criteria may, in some cases, constitute verification. In some cases, verification may include ensuring that data is complete, for example that all required data types, are present, readable, uncorrupted, and/or otherwise useful for processor 104. In some cases, some or all verification processes may be performed by processor 104. In some cases, at least a machine-learning process, for example a machine-learning model, may be used to verify. Processor 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

With continued reference to FIG. 1, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, trust datum 148 against a specification. In some cases, processor 104 may be additionally configured to validate a product by validating constituent sub-products. In some embodiments, processor 104 may be configured to validate any product or data, for example without limitation, trust datum 148. In some cases, at least a machine-learning process, for example a machine-learning model, may be used to validate by processor 104. Processor 104 may use any machine-learning process described in this disclosure for this or any other function.

With continued reference to FIG. 1, verification may be performed using blockchain authentication. Blockchain authentication may be performed using cryptographic keys which may include a trust datum generated by decision tree 128 based on data collection 108 and give access to other product such as, without limitation, user designation, NFTS, smart contract, ranked user specific moment, recommendation for NFT, any products related to NFTS on decentralized platform, and the like thereof. In a non-limiting example, the trust datum may serve as a private/public key. Certain aspects of generating and/or accessing such products above may be disclosed in U.S. Nonprovisional application Ser. No. 17/984,678, filed on Nov. 10, 2022, entitled "APPARATUS AND METHOD FOR GENERATING USER-SPECIFIC SELF-EXECUTING DATA STRUCTURES" U.S. Nonprovisional application Ser. No. 17/984,571, filed on Nov. 10, 2022, entitled "APPARATUS AND METHOD FOR MINTING NFTS FROM USER-SPECIFIC MOMENTS," U.S. Nonprovisional application Ser. No. 17/984,620, filed on Nov. 10, 2022, entitled "APPARATUSES AND METHODS FOR CURATING NFTS," U.S. Nonprovisional application Ser. No. 17/984,754, filed on Nov. 10, 2022, entitled "APPARATUS AND METHOD FOR CREATING NON-FUNGIBLE TOKENS (NFTS) FOR FUTURE USER EXPERIENCES," U.S. Nonprovisional application Ser. No. 17/984,804, filed on Nov. 10, 2022, entitled "SYSTEMS AND METHODS FOR MINTING NON-FUNGIBLE TOKENS (NFTS) FROM USER-SPECIFIC PRODUCTS AND DATA," and U.S. Nonprovisional application Ser. No. 17/984,862, filed on Nov. 10, 2022, entitled "AN APPARATUS AND METHODS FOR EXECUTING A TRANSACTION PROTOCOL FOR RIGHTS TO NON-FUNGIBLE TOKENS (NFTS)" the entirety of each one of which is incorporated herein by reference.

With continued reference to FIG. 1, apparatus 100 further includes a display 150 communicatively connected to processor 104 configured to present a visual interface 152. As used in this disclosure, a "display" is a device that output a presentation of information in visual. In a non-limiting example, display 150 may include a screen. In some cases, display 150 may be communicatively connected with processor 104. In other cases, display 150 may be electrically connected with processor 104 through one or more wires. As used in this disclosure, a "visual interface" is a form of interface that is visible to the user and allows users to interact with apparatus 100 through one or more interaction components 156. As used in this disclosure, an "interaction component" is an element that is interactable within visual interface. In a non-limiting example, visual interface 152 may be a graphical user interface (GUI). In some cases, interaction component 156, may include, without limitation, button, link, image, video, audio, and the like thereof. In some embodiments, visual interface 152 may be configured to present smart assessment 116, including, without limitation, questions of smart assessment 116, answers to questions, data collection 108, trust datum and the like thereof. In other embodiments, visual interface 152 may allow user to provide data collection 108 through one or more interaction components 156. In a non-limiting example, a visual interface 152 may be a web page displaying a single question within smart assessment 116 at a time. Single question within smart assessment 116 may include a plurality of potential answers, wherein each potential answer of plurality of potential answers may be an interaction component 156, and wherein the interaction component 156 may include a radio button.

With continued reference to FIG. 1, in some embodiments, interaction component may include an event handler 160. As used in this disclosure, an "event handler" is an element that operates asynchronously once an event 164 take place. In some cases, event handler 160 may include routine, wherein the routine is a sequence of code that is intended to be called and executed repeatedly when apparatus 100 is running. In a non-limiting example, event handler 160 may include a callback routine, wherein the callback routine may dictate one or more action that follows event 164. As used in this disclosure, an "event" is an action that take place when the user interacts with apparatus 100, display 150, visual interface 152, interaction component 156, and/or any other components/devices that user may interact with. For example, event 164 may include, without limitation, clicking, holding, pressing, tapping, swiping and the like thereof. In some cases, event 164 may include a plurality of actions. In other cases, event 164 may involve other interactive devices such as, without limitation, mouse, keyboard, display 150, headphone, any other interactive device that either electrically and/or communicatively connected to apparatus 100, and the like thereof. In a non-limiting example, user may interact with interaction component 156 through performing an event on a visual interface 152, wherein the event may include user clicking a checkbox present on the visual interface 152. In some embodiments, event handler 160 may utilize one or more application program interface (API) such as, without limitation, web events and the like thereof. Additionally, or alternatively, event handler may operate any processing step described in this disclosure. In a non-limiting example, smart assessment 116 may include an event handler, wherein the event handler may initialize and create a data collection 108 once a click action is performed on an interaction component 156 with type submit within visual interface 152 that displays smart assessment 116, and further enable processor 104 to receive the data collection 108.

Figure 2:
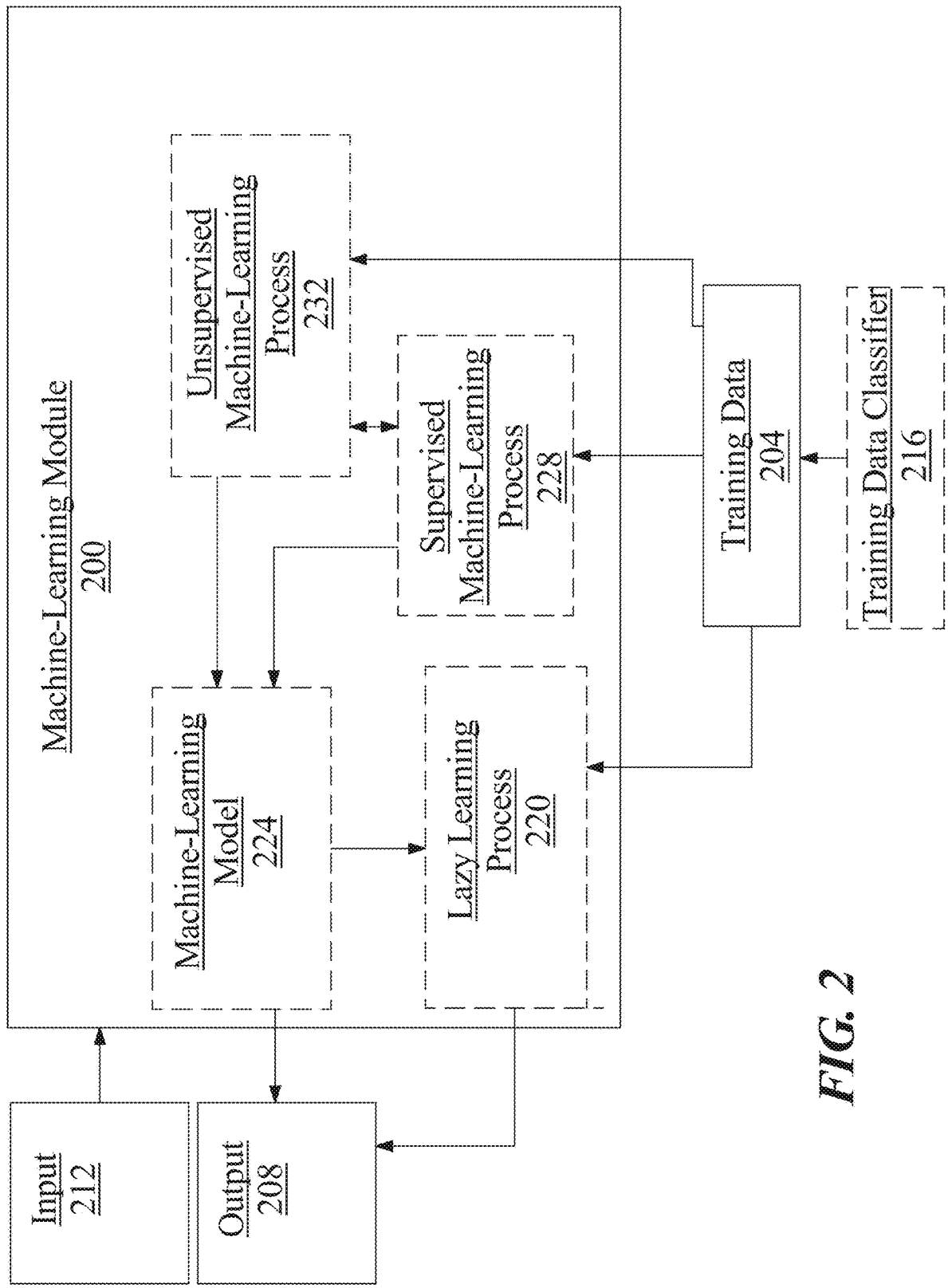
FIG. 2 is a block diagram of an exemplary machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, training data 204 may include a plurality of data collections as input data correlate to a plurality of trust datums as output data.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to trust datum 148.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of data collections as described above as inputs, a plurality of trust datum as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
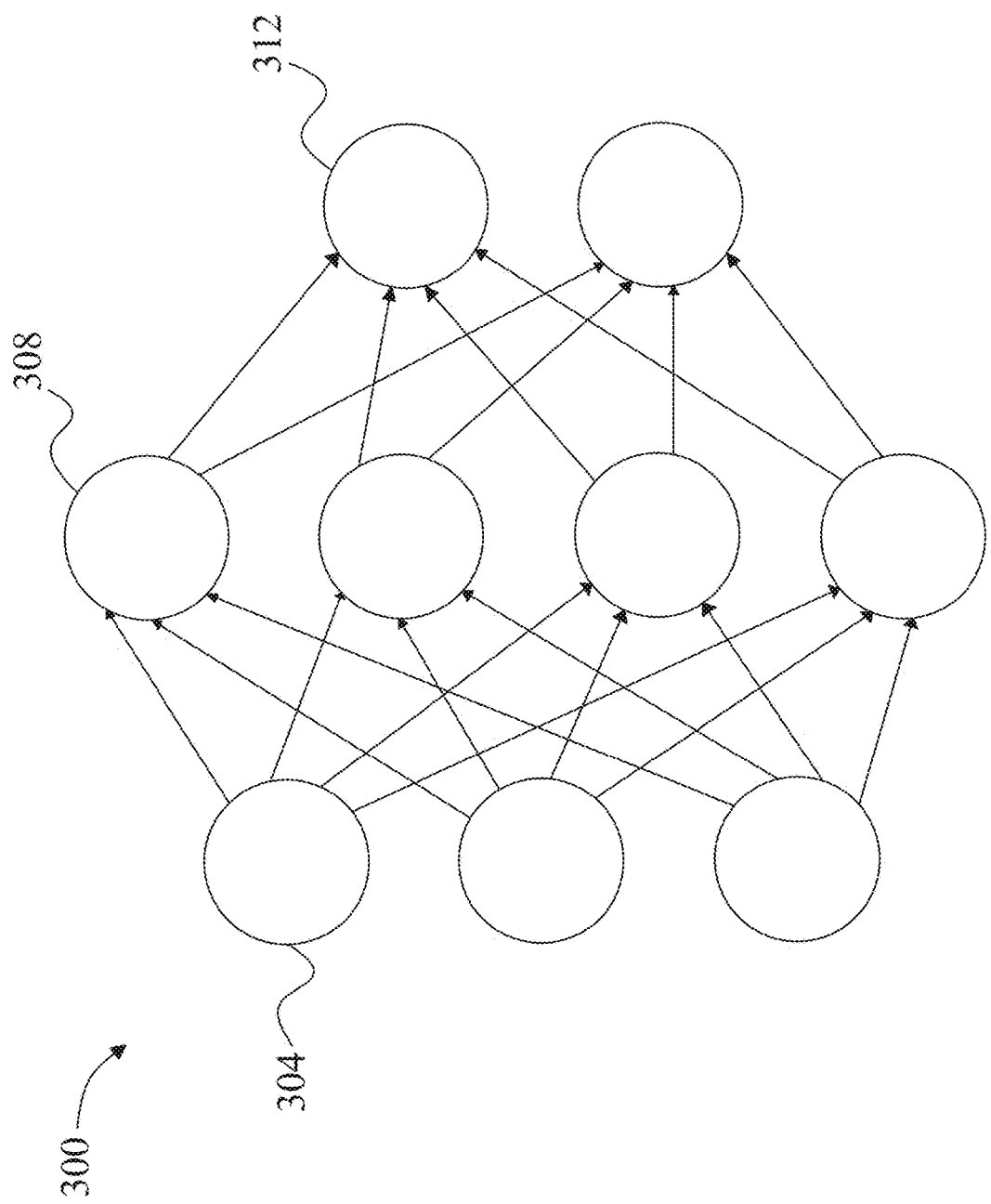
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
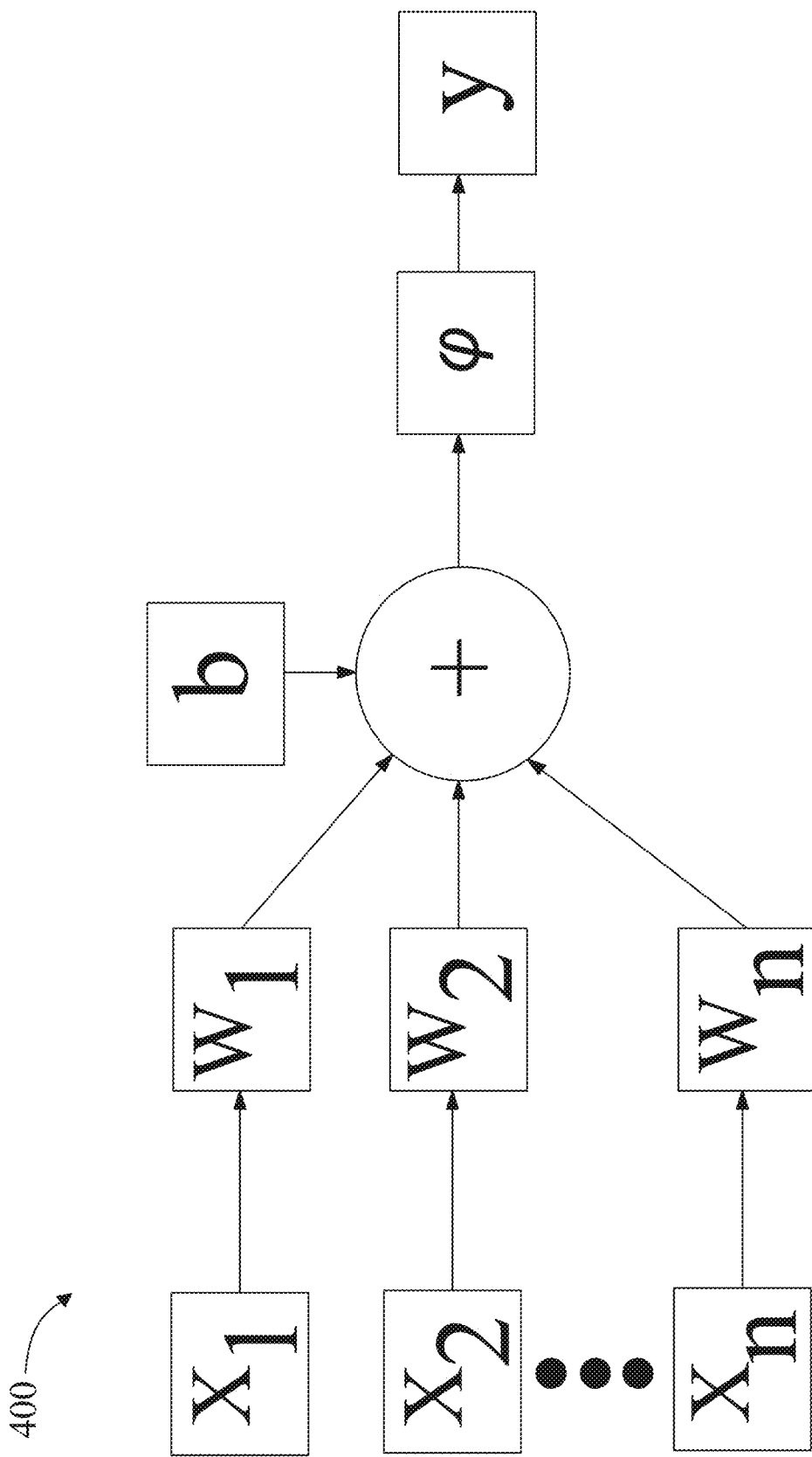
FIG. 4 is a diagram of an exemplary embodiment of a node of a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Figure 5:
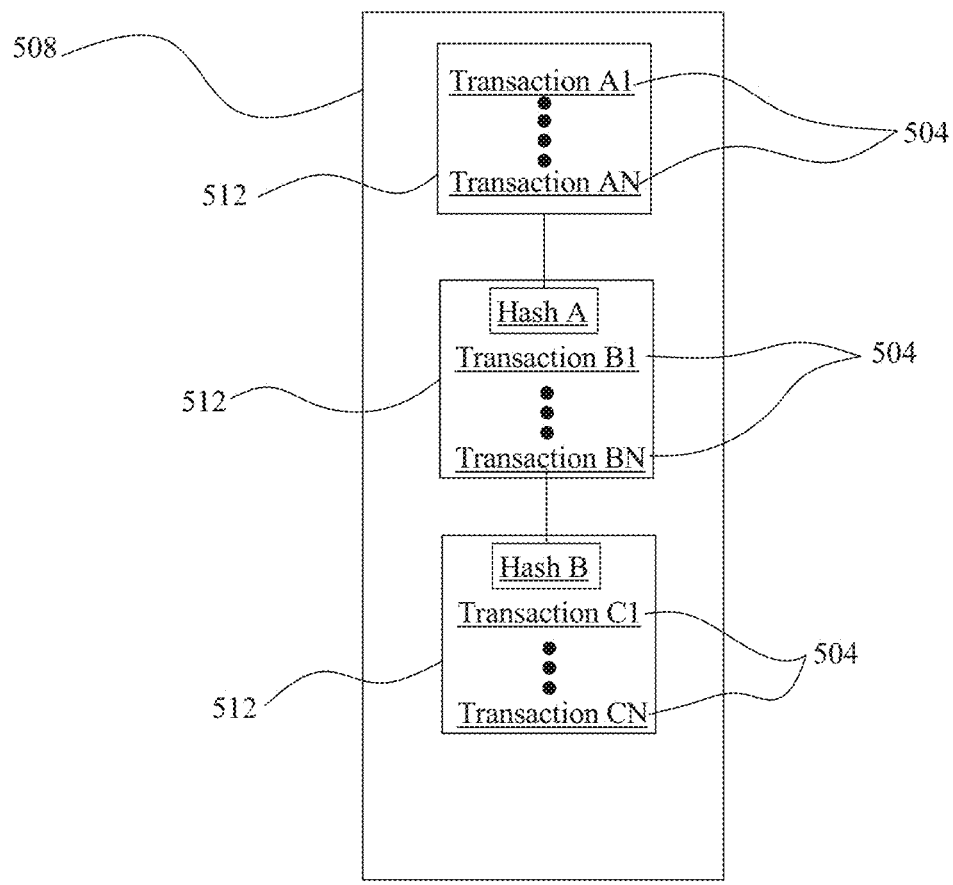
FIG. 5 is a simplified schematic diagram of an exemplary embodiment of an immutable sequential listing.

Referring now to FIG. 5, an exemplary embodiment of an immutable sequential listing 504 is illustrated. Data elements are listing in immutable sequential listing 504; data elements may include any form of data, including textual data, image data, encrypted data, cryptographically hashed data, and the like. Data elements may include, without limitation, one or more at least a digitally signed assertions. In one embodiment, a digitally signed assertion 508 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 508. In an embodiment, collection of textual data states that the owner of a certain transferable item represented in a digitally signed assertion 508 register is transferring that item to the owner of an address. A digitally signed assertion 508 may be signed by a digital signature created using the private key associated with the owner's public key, as described above.

Still referring to FIG. 5, a digitally signed assertion 508 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 508 may describe the transfer of a physical good; for instance, a digitally signed assertion 508 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 508 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 508. In some embodiments, address is linked to a public key, the corresponding private key of which is owned by the recipient of a digitally signed assertion 508. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 508 may record a subsequent a digitally signed assertion 508 transferring some or all of the value transferred in the first a digitally signed assertion 508 to a new address in the same manner. A digitally signed assertion 508 may contain textual information that is not a transfer of some item of value in addition to, or as an alternative to, such a transfer. For instance, as described in further detail below, a digitally signed assertion 508 may indicate a confidence level associated with a distributed storage node as described in further detail below.

In an embodiment, and still referring to FIG. 5 immutable sequential listing 504 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 504 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 504 may preserve the order in which the at least a posted content took place by listing them in chronological order; alternatively or additionally, immutable sequential listing 504 may organize digitally signed assertions 508 into sub-listings 512 such as "blocks" in a blockchain, which may be themselves collected in a temporally sequential order; digitally signed assertions 508 within a sub-listing 512 may or may not be temporally sequential. The ledger may preserve the order in which at least a posted content took place by listing them in sub-listings 512 and placing the sub-listings 512 in chronological order. The immutable sequential listing 504 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 504 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 5, immutable sequential listing 504, once formed, may be inalterable by any party, no matter what access rights that party possesses. For instance, immutable sequential listing 504 may include a hash chain, in which data is added during a successive hashing process to ensure non-repudiation. Immutable sequential listing 504 may include a block chain. In one embodiment, a block chain is immutable sequential listing 504 that records one or more new at least a posted content in a data item known as a sub-listing 512 or "block." An example of a block chain is the BITCOIN block chain used to record BITCOIN transactions and values. Sub-listings 512 may be created in a way that places the sub-listings 512 in chronological order and link each sub-listing 512 to a previous sub-listing 512 in the chronological order so that any computing device may traverse the sub-listings 512 in reverse chronological order to verify any at least a posted content listed in the block chain. Each new sub-listing 512 may be required to contain a cryptographic hash describing the previous sub-listing 512. In some embodiments, the block chain contains a single first sub-listing 512 sometimes known as a "genesis block."

Still referring to FIG. 5, the creation of a new sub-listing 512 may be computationally expensive; for instance, the creation of a new sub-listing 512 may be designed by a "proof of work" protocol accepted by all participants in forming the immutable sequential listing 504 to take a powerful set of computing devices a certain period of time to produce. Where one sub-listing 512 takes less time for a given set of computing devices to produce the sub-listing 512 protocol may adjust the algorithm to produce the next sub-listing 512 so that it will require more steps; where one sub-listing 512 takes more time for a given set of computing devices to produce the sub-listing 512 protocol may adjust the algorithm to produce the next sub-listing 512 so that it will require fewer steps. As an example, protocol may require a new sub-listing 512 to contain a cryptographic hash describing its contents; the cryptographic hash may be required to satisfy a mathematical condition, achieved by having the sub-listing 512 contain a number, called a nonce, whose value is determined after the fact by the discovery of the hash that satisfies the mathematical condition. Continuing the example, the protocol may be able to adjust the mathematical condition so that the discovery of the hash describing a sub-listing 512 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 512 according to the protocol is known as "mining." The creation of a new sub-listing 512 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 512. The incentive may be financial; for instance, successfully mining a new sub-listing 512 may result in the person or entity that mines the sub-listing 512 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 512 Each sub-listing 512 created in immutable sequential listing 504 may contain a record or at least a posted content describing one or more addresses that receive an incentive, such as virtual currency, as the result of successfully mining the sub-listing 512.

With continued reference to FIG. 5, where two entities simultaneously create new sub-listings 512, immutable sequential listing 504 may develop a fork; protocol may determine which of the two alternate branches in the fork is the valid new portion of the immutable sequential listing 504 by evaluating, after a certain amount of time has passed, which branch is longer. "Length" may be measured according to the number of sub-listings 512 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 512 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 504 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 504.

Still referring to FIG. 5, additional data linked to at least a posted content may be incorporated in sub-listings 512 in the immutable sequential listing 504; for instance, data may be incorporated in one or more fields recognized by block chain protocols that permit a person or computer forming a at least a posted content to insert additional data in the immutable sequential listing 504. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 5, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency.

Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 512 in a block chain computationally challenging; the incentive for producing sub-listings 512 may include the grant of new crypto currency to the miners. Quantities of crypto currency may be exchanged using at least a posted content as described above.

Figure 6:
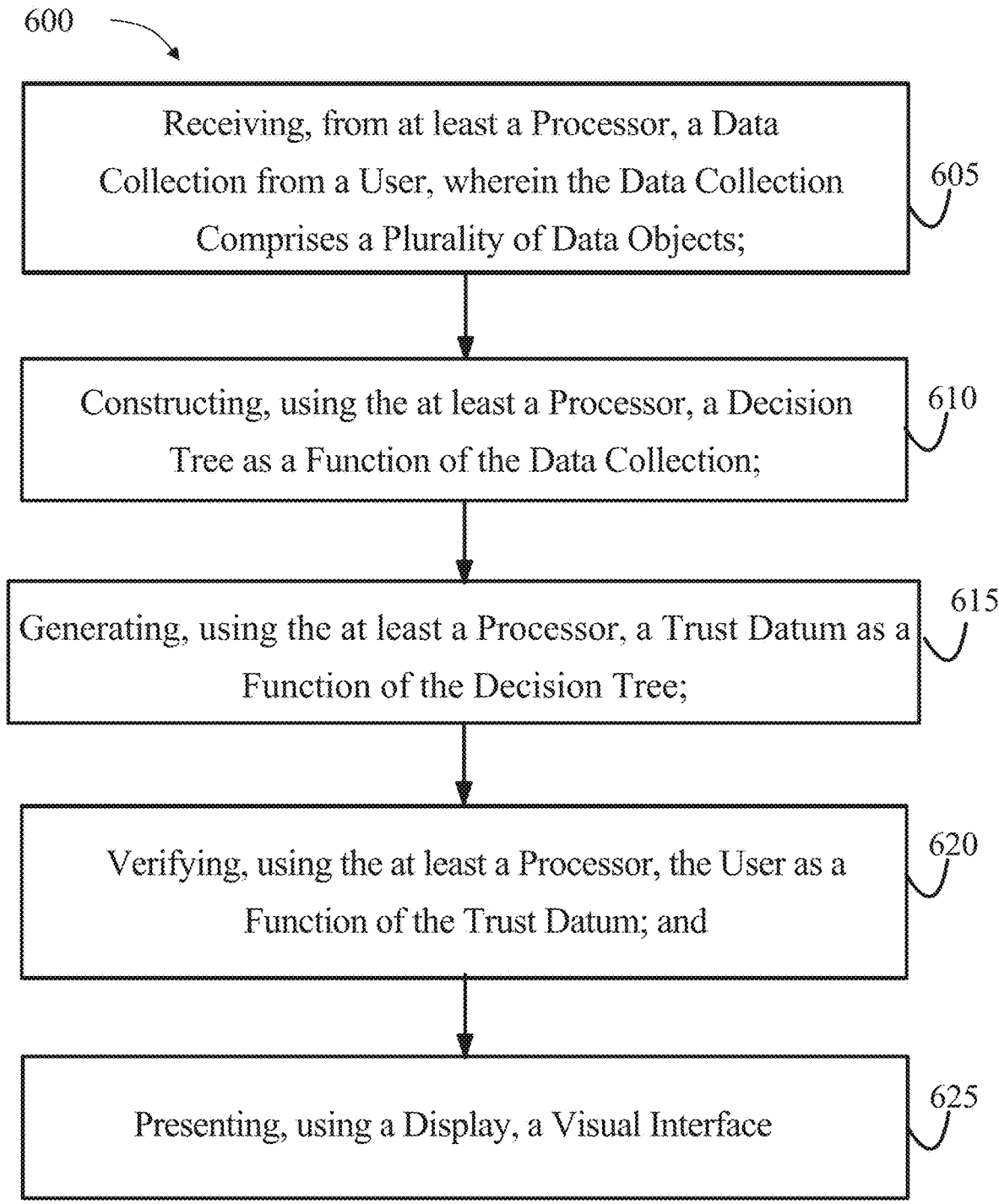
FIG. 6 is a flow diagram of an exemplary method for vetting user using a computing device.

Referring now to FIG. 6, a flow diagram of an exemplary method 600 for vetting user using a computing device is illustrated. Method 600 includes a step 605 of receiving, using at least a processor, a data collection containing a plurality of data objects, without limitation, as described above in reference to FIGS. 1-5. In some embodiments, data collection may include an implicit data collection. This may be implemented, without limitation, as described above in reference to FIGS. 1-5. In some embodiments, step 605 of receiving the data collection may include accepting a smart assessment from the user. In some embodiments, smart assessment may include a data submission from the user. This may be implemented, without limitation, as described above in reference to FIGS. 1-5. In other embodiments, step 605 of receiving the data collection may include encoding the data collection using a data collection encoder. This may be implemented, without limitation, as described above in reference to FIGS. 1-5.

With continued reference to FIG. 6, method 600 includes a step 610 of constructing, using the at least a processor, a decision tree as a function of the data collection, wherein the decision tree includes a plurality of nodes. This may be implemented, without limitation, as described above in reference to FIGS. 1-5. In some embodiments, each node of plurality of tree nodes may include a trust machine-learning model trained using a trust training data, wherein the trust training data comprises a plurality of data collection as input correlate to a plurality of trust datums as output. This may be implemented, without limitation, as described above in reference to FIGS. 1-5.

With continued reference to FIG. 6, method 600 includes a step 615 of generating, using the at least a processor, a trust datum as a function of the decision tree, without limitation, as described above in reference to FIGS. 1-5. In some embodiments, step 615 of generating the trust datum may include traversing the decision tree as a function of the data collection, identifying a node within the decision tree, and generating the trust datum as a function of the identified node. In some embodiments, traversing the decision tree may include mapping the plurality of data objects to the plurality of nodes. This may be implemented, without limitation, as described above in reference to FIGS. 1-5. In some embodiments, step 615 of generating the trust datum may include classifying the data collection to the trust datum as a function of the trust machine-learning model. In other embodiments, step 615 of generating the trust datum may include modifying the smart assessment as a function of the trust datum. This may be implemented without limitation, as described above in reference to FIGS. 1-5.

With continued reference to FIG. 6, method 600 includes a step 620 of verifying, using the at least a processor, the user as a function of the trust datum. This may be implemented without limitation, as described above in reference to FIGS. 1-5.

With continued reference to FIG. 6, method 600 includes a step 625 of presenting, using a display, a visual interface, without limitation, as described above in reference to FIGS. 1-5. In some embodiments, visual interface may include an interaction component comprises an event handler. This may be implemented without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
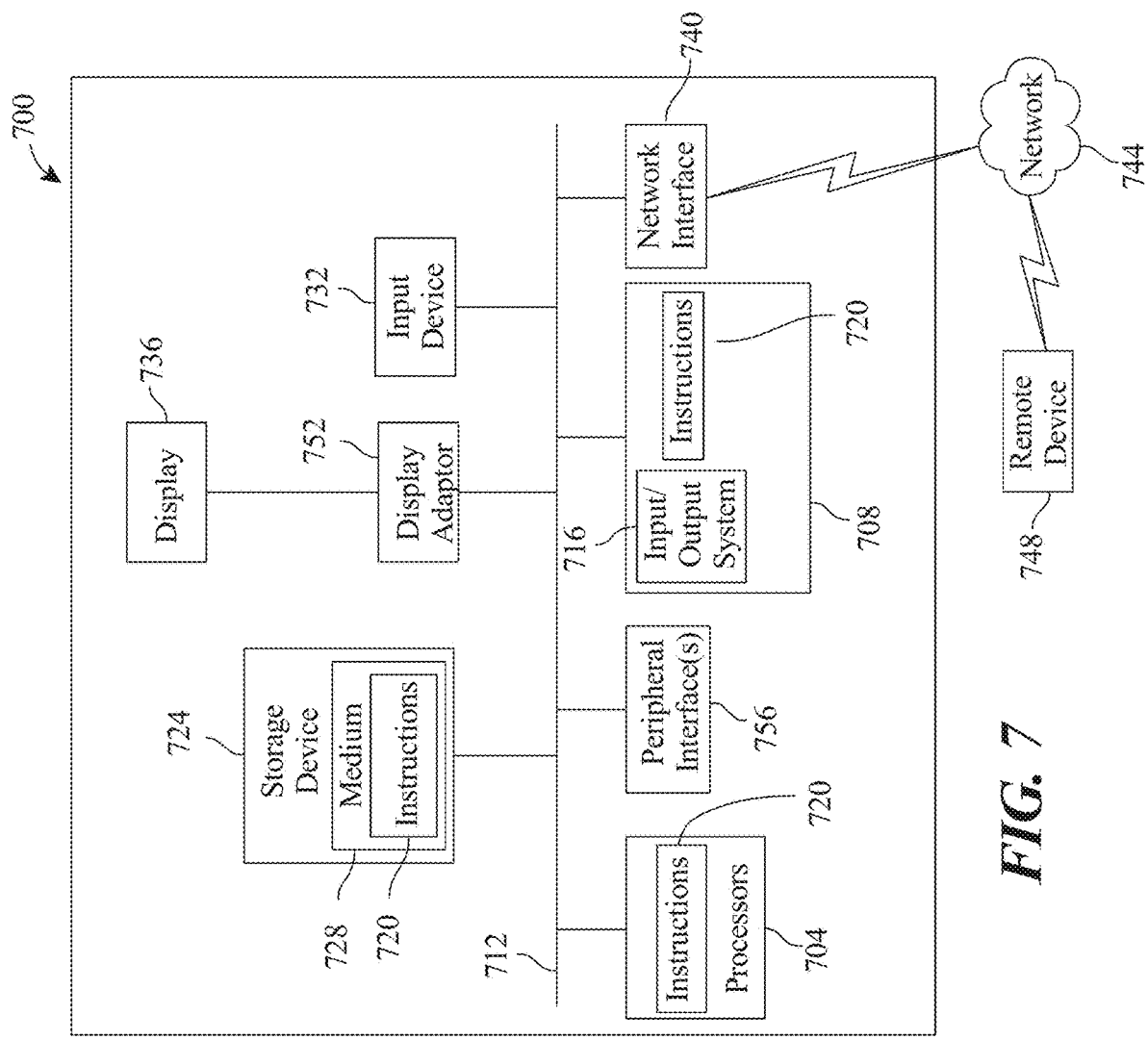
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for vetting a user using a computing device, wherein the apparatus comprises:
   at least a processor;
   a memory communicatively connected to the at least a processor, wherein the memory contains instructions configuring the at least a processor to:
      receive a data collection from a user, wherein the data collection comprises a plurality of data objects;
      construct a decision tree as a function of the data collection, wherein the decision tree comprises a plurality of nodes, wherein constructing the decision tree further comprises:
         accepting user responses to a smart assessment, wherein the smart assessment comprises a set of questions directed to the user including a base question for the user, wherein accepting the user responses further comprises:
            receiving an answer to the base question of the smart assessment from the user;
            generating questions, using a partially constructed version of the decision tree, within the smart assessment based on the answer to the base question from the user; and
            receiving answers to the generated questions of the smart assessment from the user, wherein the user's answers to the smart assessment comprise a part of the data collection;
      generate a trust datum as a function of the decision tree; and
      verify the user as a function of the trust datum; and
   a display communicatively connected to the at least a processor and configured to present a visual interface.

2. The apparatus of claim 1, wherein the data collection comprises an implicit data collection.

3. The apparatus of claim 1, wherein receiving the data collection comprises encoding the data collection using a data collection encoder.

4. The apparatus of claim 1, wherein the smart assessment comprises a data submission from the user.

5. The apparatus of claim 1, wherein generating the trust datum comprises:
   traversing the decision tree as a function of the data collection;
   identifying a node within the decision tree; and
   generating the trust datum as a function of the identified node.

6. The apparatus of claim 5, wherein traversing the decision tree comprises mapping the plurality of data objects to the plurality of nodes.

7. The apparatus of claim 1, wherein each node of the plurality of nodes comprises:
   a utilization of a trust machine-learning model trained using a trust training data, wherein the trust training data comprises a plurality of data collection as input correlated to a plurality of trust datums as output.

8. The apparatus of claim 7, wherein generating the trust datum comprises classifying the data collection to the trust datum as a function of the trust machine-learning model.

9. The apparatus of claim 1, wherein generating the trust datum comprises modifying the smart assessment as a function of the trust datum.

10. A method for vetting a user using a computing device, the method comprising:
    receiving, using at least a processor, a data collection comprising a plurality of data objects;
    constructing, using the at least a processor, a decision tree as a function of the data collection, wherein the decision tree comprises a plurality of nodes, wherein constructing the decision tree further comprises:
       accepting user responses to a smart assessment, wherein the smart assessment comprises a set of questions directed to the user including a base question for the user, wherein accepting the user responses further comprises:
          receiving an answer to the base question of the smart assessment from the user;
          generating questions, using a partially constructed version of the decision tree, within the smart assessment based on the answer to the base question from the user; and
          receiving answers to the generated questions of the smart assessment from the user, wherein the user's answers to the smart assessment comprise a part of the data collection;
    generating, using the at least a processor, a trust datum as a function of the decision tree;
    verifying, using the at least a processor, the user as a function of the trust datum; and
    presenting, using a display, a visual interface.

11. The method of claim 10, wherein the data collection comprises an implicit data collection.

12. The method of claim 10, wherein receiving the data collection comprises encoding the data collection using a data collection encoder.

13. The method of claim 10, wherein the smart assessment comprises a data submission from the user.

14. The method of claim 10, wherein generating the trust datum comprises:
    traversing the decision tree as a function of the data collection;
    identifying a node within the decision tree; and
    generating the trust datum as a function of the identified node.

15. The method of claim 14, wherein traversing the decision tree comprises mapping the plurality of data objects to the plurality of nodes.

16. The method of claim 10, wherein each node of the plurality of nodes comprises:
   a utilization of a trust machine-learning model trained using a trust training data, wherein the trust training data comprises a plurality of data collection as input correlated to a plurality of trust datums as output.

17. The method of claim 16, wherein generating the trust datum comprises classifying the data collection to the trust datum as a function of the trust machine-learning model.

18. The method of claim 10, wherein generating the trust datum comprises modifying the smart assessment as a function of the trust datum.

\* \* \* \* \*